US007941016B2

(12) United States Patent
Shimizu

(10) Patent No.: US 7,941,016 B2
(45) Date of Patent: May 10, 2011

(54) OPTICAL WAVEGUIDE FOR TOUCH PANEL AND TOUCH PANEL USING THE SAME

(75) Inventor: Yusuke Shimizu, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 378 days.

(21) Appl. No.: 12/324,192

(22) Filed: Nov. 26, 2008

(65) Prior Publication Data
US 2009/0141005 A1    Jun. 4, 2009

Related U.S. Application Data

(60) Provisional application No. 61/018,699, filed on Jan. 3, 2008.

(30) Foreign Application Priority Data

Nov. 29, 2007    (JP) .............................. 2007-309286

(51) Int. Cl.
  G02B 6/00    (2006.01)
  G02B 6/26    (2006.01)
  G02B 6/42    (2006.01)

(52) U.S. Cl. ............. 385/32; 385/14; 385/31; 385/129; 345/175; 345/176

(58) Field of Classification Search .................. 385/14, 385/31, 32, 129–132; 345/173, 175, 176; 349/12
See application file for complete search history.

(56) References Cited

U.S. PATENT DOCUMENTS

| 7,099,553 | B1 * | 8/2006 | Graham et al. ............... 385/146 |
| 7,369,724 | B2 * | 5/2008 | Deane ............................. 385/33 |
| 7,630,600 | B2 * | 12/2009 | Shimizu ......................... 385/31 |
| 7,809,221 | B2 * | 10/2010 | Deane ............................. 385/33 |
| 2004/0201579 | A1 | 10/2004 | Graham |
| 2005/0201681 | A1 * | 9/2005 | Payne ............................. 385/33 |
| 2006/0001653 | A1 | 1/2006 | Smits |
| 2008/0074402 | A1 * | 3/2008 | Cornish et al. ................. 345/176 |
| 2008/0252620 | A1 * | 10/2008 | Shimizu ......................... 345/176 |

FOREIGN PATENT DOCUMENTS

| EP | 0520669 A2 | 12/1992 |
| JP | 5189122 A | 7/1993 |
| JP | 2006-522987 A | 10/2006 |
| WO | 2004/093045 A1 | 10/2004 |
| WO | 2006/004775 A1 | 1/2006 |
| WO | 2007/128039 A1 | 11/2007 |

OTHER PUBLICATIONS

Decision of Patent Grant dated May 18, 2010, issued in corresponding Japanese Patent Application No. 2007-309286.

* cited by examiner

*Primary Examiner* — Daniel Petkovsek
(74) *Attorney, Agent, or Firm* — Westerman, Hattori, Daniels & Adrian, LLP

(57) ABSTRACT

A touch panel optical waveguide which obviates the need for positioning light receiving cores of the optical waveguide with respect to light emitting cores of the optical waveguide, and to provide a touch panel employing the optical waveguide. A projection (5) is provided in one of longitudinally opposite end portions of an elongated optical waveguide (A), and a recess (6) to be engaged with the projection (5) is provided in the other end portion of the elongated optical waveguide (A). By engaging the projection (5) with the recess (6), distal ends of light emitting cores (3) are automatically and accurately opposed to distal ends of light receiving cores (3) with the intervention of a display screen of a touch panel.

4 Claims, 6 Drawing Sheets

PRIOR ART

OPTICAL WAVEGUIDE FOR TOUCH PANEL AND TOUCH PANEL USING THE SAME

RELATED APPLICATIONS

This application claims the benefit of U.S. Provisional Application No. 61/018,699, filed Jan. 3, 2008, which is hereby incorporated by reference.

BACKGROUND OF THE INVENTION

1. Field of the Invention

The present invention relates to an optical waveguide for a touch panel, and a touch panel employing the optical waveguide.

2. Description of the Related Art

Touch panels are input devices for operating an apparatus by directly touching a display screen of a liquid crystal display device or the like by a finger, a special stylus or the like, and include a display which displays operation items, and detection means which detects the position (coordinates) of a portion of the display screen of the display touched by the finger or the like. Information of the touch position detected by the detection means is sent in the form of a signal to the apparatus, which in turn performs an operation specified by the touch position. Examples of the apparatus employing such a touch panel include ATMs in banking facilities, ticket venders in stations and portable game machines.

A detection device employing an optical waveguide is proposed as the detection means for detecting the finger touch position on the touch panel (see, for example, US2004/0201579A1). As shown in a plan view of FIG. 6, the optical waveguide is disposed around a periphery of a display screen of a rectangular display 31, and includes an L-shaped optical waveguide $B_1$ including a multiplicity of light emitting cores which emit light beams W parallel to the display screen of the display 31, and two linear optical waveguides $B_2$, $B_3$ including a multiplicity of light receiving cores which respectively receive the light beams W emitted from linear portions of the L-shaped optical waveguide $B_1$. Thus, these three optical waveguides $B_1$, $B_2$, $B_3$ cause the light beams W to travel in a lattice form on the display screen of the display 31 (the light beams W are illustrated in a simplified manner in FIG. 6) When a portion of the display screen of the display 31 is touched by the finger in this state, the finger blocks some of the light beams W. Therefore, the position of the portion touched by the finger is detected by detecting a light blocked portion by the two linear optical waveguides $B_2$, $B_3$.

In the case of the touch panel of US2004/0201579A1, however, unless the two linear optical waveguides $B_2$, $B_3$ which receive the light beams W are accurately positioned with respect to the L-shaped optical waveguide $B_1$ which emits the light beams W, the optical waveguides $B_2$, $B_3$ cannot receive the light beams W, failing to function as the detection means. In addition, end faces of the respective cores serving as light output/input surfaces each have a very small size, so that the accurate positioning requires tremendous effort and time.

SUMMARY OF THE INVENTION

In view of the foregoing, it is an object of the present invention to provide a touch panel optical waveguide which obviates the need for positioning the light receiving cores of the optical waveguide with respect to the light emitting cores of the optical waveguide, and to provide a touch panel employing the optical waveguide.

According to a first aspect of the present invention to achieve the aforementioned object, there is provided an elongated touch panel optical waveguide to be wrapped around a periphery of a display of a touch panel, the optical waveguide including: a plurality of light emitting cores provided in a longitudinal generally-half portion of the elongated touch panel optical waveguide; a plurality of light receiving cores provided in the other longitudinal generally-half portion of the optical waveguide; the light emitting cores and the light receiving cores each having a distal end which is located on one longitudinal side edge of the elongated touch panel optical waveguide; a projection provided in one of longitudinally opposite end portions of the elongated touch panel optical waveguide; and a recess provided in the other end portion to be engaged with the projection; wherein the distal ends of the light emitting cores are positioned in opposed relation to the distal ends of the light receiving cores with the intervention of the display screen of the touch panel with the projection in engagement with the recess.

According to a second aspect of the present invention, there is provided a touch panel optical waveguide including: a set of two generally L-shaped planar optical waveguides to be disposed in a frame configuration around a periphery of a display screen of a display of a touch panel; one of the generally L-shaped planar optical waveguides including a plurality of light emitting cores each having a distal end positioned on an inward edge thereof; the other generally L-shaped planar optical waveguide including a plurality of light receiving cores each having a distal end positioned on an inward edge thereof; the one generally L-shaped planar optical waveguide having a recess or a projection provided in longitudinally opposite end portions thereof; the other generally L-shaped planar optical waveguide having a projection or a recess provided in longitudinally opposite end portions thereof to be respectively engaged with the recess or the projection of the one generally L-shaped planar optical waveguide; wherein the distal ends of the light emitting cores of the one generally L-shaped planar optical waveguide are positioned in opposed relation to the distal ends of the light receiving cores of the other generally L-shaped planar optical waveguide with the intervention of the display screen of the touch panel with the projections in engagement with the recesses.

According to a third aspect of the present invention, there is provided a touch panel, which includes the touch panel optical waveguide of the first aspect wrapped around a periphery of a display of the touch panel, wherein the projection provided in the one of the longitudinally opposite end portions of the touch panel optical waveguide is engaged with the recess provided in the other end portion, and the distal ends of the light emitting cores are positioned in opposed relation to the distal ends of the light receiving cores with the intervention of a display screen of the display of the touch panel.

According to a fourth aspect of the present invention, there is provided a touch panel, which includes the touch panel optical waveguide of the second aspect disposed in a frame configuration around a periphery of a display screen of a display of the touch panel, wherein the projection and the recess provided in the longitudinally opposite end portions of one of the two generally L-shaped planar optical waveguides are respectively engaged with the recess and the projection provided in the longitudinally opposite end portions of the other generally L-shaped planar optical waveguide, and the distal ends of the light emitting cores are positioned in opposed relation to the distal ends of the light receiving cores with the intervention of the display screen of the touch panel.

The elongated touch panel optical waveguide of the first inventive aspect has the projection provided in the one of the longitudinally opposite end portions thereof and the recess provided in the other end portion thereof. Therefore, the distal ends of the light emitting cores can be automatically and accurately opposed to the distal ends of the light receiving cores with the intervention of the display screen of the touch panel simply by wrapping the elongated touch panel optical waveguide around the periphery of the display of the touch panel and, in this state, engaging the projection with the recess. This simplifies the operation and, at the same time, reduces the operation time.

The touch panel optical waveguide of the second inventive aspect includes the set of two generally L-shaped planar optical waveguides. The one of the two generally L-shaped planar optical waveguides has the projection or the recess provided in the longitudinally opposite end portions thereof. The other generally L-shaped planar optical waveguide has the recess or the projection provided in the longitudinally opposite end portions thereof to be respectively engaged with the projection or the recess of the one generally L-shaped planar optical waveguide. Therefore, the distal ends of the light emitting cores can be automatically and accurately opposed to the distal ends of the light receiving cores with the intervention of the display screen of the touch panel by fitting the two generally L-shaped planar optical waveguides around the periphery of the display screen of the display of the touch panel in the frame configuration and engaging the projections with the recesses. This simplifies the operation and, at the same time, reduces the operation time.

The touch panel of the third inventive aspect includes the touch panel optical waveguide of the first inventive aspect wrapped around the periphery of the display of the touch panel. The projection provided in the one of the longitudinally opposite end portions of the touch panel optical waveguide is engaged with the recess provided in the other end portion, whereby the light emitting cores are positioned with respect to the light receiving cores. Therefore, the distal ends of the light emitting cores are accurately opposed to the distal ends of the light receiving cores with the intervention of the display screen of the touch panel.

The touch panel of the fourth inventive aspect includes the touch panel optical waveguide of the second inventive aspect disposed in the frame configuration around the periphery of the display screen of the display of the touch panel. The projection and the recess provided in the opposite end portions of the one generally L-shaped planar optical waveguide are respectively engaged with the recess and the projection provided in the opposite end portions of the other generally L-shaped planar optical waveguide, whereby the light emitting cores are positioned with respect to the light receiving cores. Therefore, the distal ends of the light emitting cores are accurately opposed to the distal ends of the light receiving cores with the intervention of the display screen of the touch panel.

DETAILED DESCRIPTION

Embodiments of the present invention will hereinafter be described in detail with reference to the drawings.

Figure 1A:
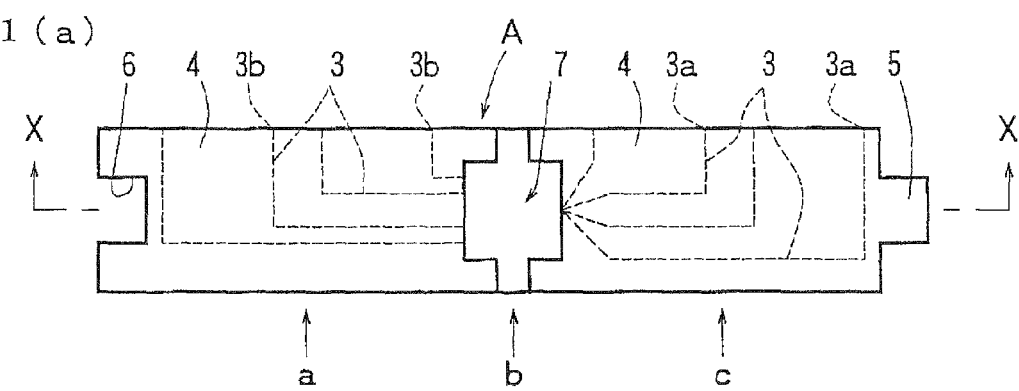
FIG. 1(a) is a front view and FIG. 1(b) is an X-X sectional view of FIG. 1(a), schematically illustrating an optical waveguide according to a first embodiment of the present invention.
Figure 1B:
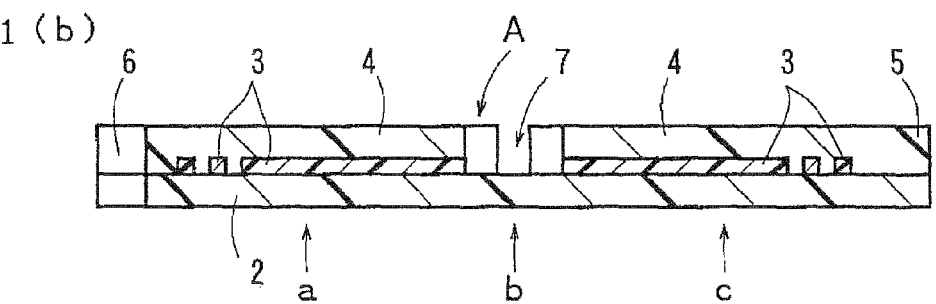

FIGS. 1(a) and 1(b) illustrate a touch panel optical waveguide according to a first embodiment of the present invention. The touch panel optical waveguide according to this embodiment (hereinafter referred to simply as "optical waveguide") is bent to be fitted on side surfaces of a display 31 and wrapped around the periphery of the display 31 as shown in a horizontal sectional view of FIG. 2(a). An unbent state of the optical waveguide before the wrapping is shown in FIGS. 1(a) and 1(b) The optical waveguide A is elongated, and includes a plurality of cores 3 held between and enclosed by an under-cladding layer 2 and over-cladding layers 4. A recess 7 in which light emitting means 12 and light receiving means 13 (see FIG. 2(a)) are mounted is provided in a middle portion of the elongated optical waveguide A. The cores 3 include light emitting cores 3 located between the recess 7 and one of longitudinally opposite ends of the optical waveguide A (one longitudinal generally-half portion on the right side in FIGS. 1(a) and 1(b)), and light receiving cores 3 located between the recess 7 and the other end of the optical waveguide A (the other longitudinal generally-half portion on the left side in FIGS. 1(a) and 1(b)). Distal ends 3a of the light emitting cores 3 and distal ends 3b of the light receiving cores 3 are positioned and exposed at predetermined positions on a longitudinal side edge of the elongated optical waveguide A.

In the present invention, the elongated optical waveguide A has a projection 5 provided in one of longitudinally opposite end portions thereof (in a right end portion in FIGS. 1(a) and 1(b)), and a recess 6 provided in the other of the longitudinally opposite end portions thereof (in a left end portion in FIGS. 1(a) and 1(b)) to be engaged with the projection 5. In FIG. 1(a), the cores 3 are indicated by broken lines, and the thicknesses of the broken lines indicate the widths of the cores 3. In FIG. 1(a), the cores 3 are illustrated with some of them omitted. In FIGS. 1(a) and 1(b), reference characters a to c indicate positions at which the optical waveguide A is bent to be wrapped around the periphery of the display 31 (see FIG. 2(a)).

Figure 2A:
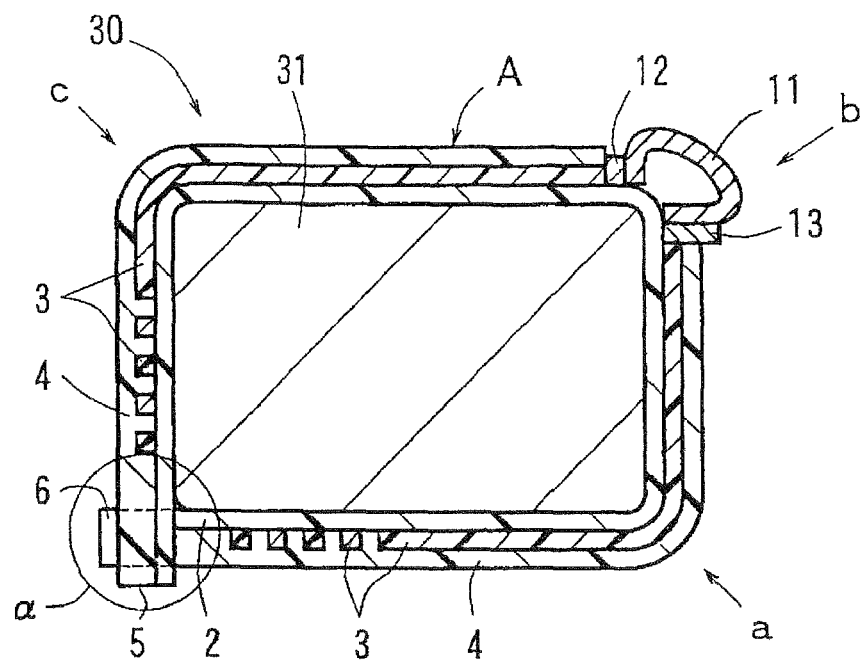
FIG. 2(a) is a horizontal sectional view schematically illustrating a touch panel employing the aforementioned optical waveguide.
Figure 2B:
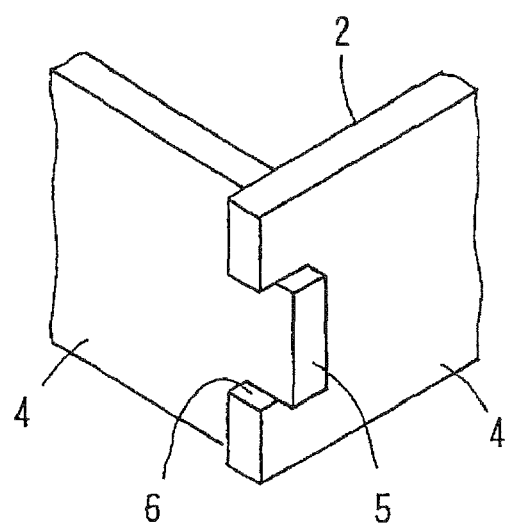
FIG. 2(b) is an enlarged perspective view of a portion indicated by a circle a in FIG. 2(a) showing engagement of a projection and a recess of the optical waveguide.
Figure 3A:
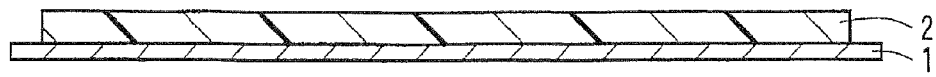
FIGS. 3(a) to 3(e) are explanatory diagrams schematically showing a production method for the optical waveguide.
Figure 3B:
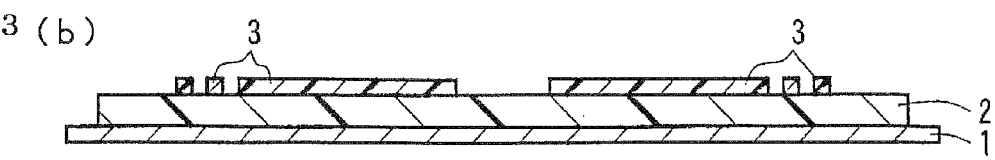
Figure 3C:
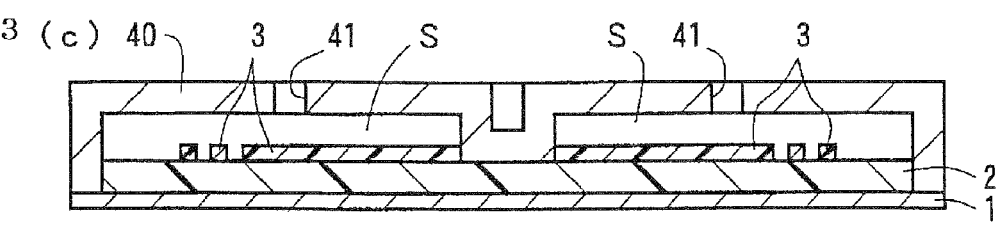
Figure 3D:
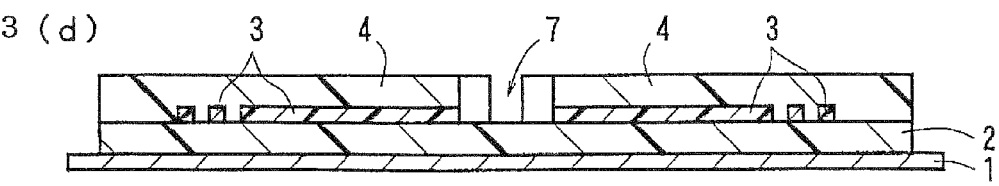
Figure 3E:
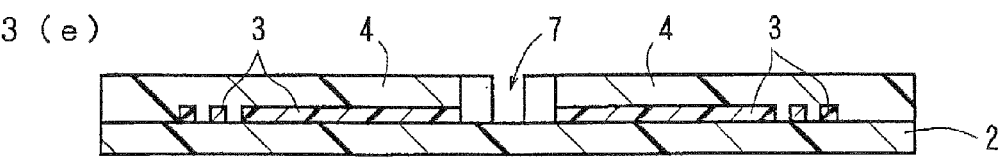

As shown in FIG. 2(a) and FIG. 2(b) (which is an enlarged perspective view of a portion indicated by a circle a in FIG. 2(a)), the projection 5 and the recess 6 are engaged with each other when the optical waveguide A is wrapped around the periphery of the display 31. For the wrapping, as shown in FIG. 2(a), the elongated optical waveguide A is bent at the positions a to c corresponding to four corners of the rectangular display 31 to be fitted around the periphery of the display 31 with its under-cladding layer 2 facing inward and with its recess 7 facing outward. Then, as shown in FIG. 2(b), the projection 5 provided in the one end portion of the elongated optical waveguide A is engaged with the recess provided in the other end portion at one of the corners of the display 31 (at a lower left corner in FIG. 2(a)). The inventive elongated optical waveguide A is designed such that the distal ends of the light emitting cores 3 are accurately opposed to the distal ends of the light receiving cores 3 with the intervention of the display screen of the display 31 (see FIG. 2(a)). With the projection 5 in engagement with the recess 6, therefore, the distal ends of the light emitting cores 3 are automatically and accurately opposed to the distal ends of the light receiving cores 3, respectively, with the intervention of the display screen of the display 31.

It is noted that no core 3 is present on and around the projection 5 and the recess 6, but surface portions of the under-cladding layer 2 on and around the projection 5 and the recess 6 are covered with the over-cladding layers 4. The projection 5 has, for example, a projection length of 3 to 30 mm, and a projection width of 3 to 30 mm. The recess 6 is dimensioned such as to be engaged with the projection 5 (a depth of 3 to 30 mm and a recess width of 3 to 30 mm).

In this embodiment, as described above, the recess 7 in which the light emitting means 12 and the light receiving means 13 are mounted is provided in the middle portion of the elongated optical waveguide A. As shown in FIGS. 1(*a*) and 1(*b*), the recess 7 has a bottom defined by an exposed rectangular surface portion of the under-cladding layer 2 and wall surfaces defined by end faces of the cores 3 and the over-cladding layers 4. The proximal ends of the light emitting cores 3 are concentrated on a single point and exposed on one of the wall surfaces of the recess 7 (a right wall surface in FIGS. 1(*a*) and 1(*b*)), and abut against the light emitting means 12 (see FIG. 2(*a*)). The proximal ends of the light receiving cores 3 are exposed on the other wall surface of the recess 7 (a left wall surface in FIGS. 1(*a*) and 1(*b*)), and abut against the light receiving means 13 (see FIG. 2(*a*)).

As shown in FIG. 2(*a*), the light emitting means 12 and the light receiving means 13 are fixed to opposite ends of a flexible substrate 11. For the mounting of the light emitting means 12 and the light receiving means 13 on the elongated optical waveguide A, the substrate 11 is arcuately flexed with the light emitting means 12 and the light receiving means 13 facing outward, and the light emitting means 12 and the light receiving means 13 are inserted in the recess 7 provided in the longitudinally middle portion of the optical waveguide A and fixed to the optical waveguide A by utilizing a restoring force of the flexed substrate 11 before or after the optical waveguide A is wrapped around the display 31. Then, as required, the same material as the over-cladding layers 4 or an adhesive (not shown) is used for fixing the light emitting means 12 and the light receiving means 13 to the optical waveguide A. A VCSEL (Vertical Cavity Surface Emitting Laser), a light emitting diode, a laser diode or the like is typically used as the light emitting means 12. An ASIC (Application Specific Integrated Circuit) or the like is typically used as the light receiving means 13. With this arrangement, alignment between the light emitting cores 3 and the light emitting means 12 and alignment between the light receiving cores 3 and the light receiving means 13 can be simultaneously achieved, so that the effort and time required for the alignment can be reduced as compared with the prior art.

The dimensions of the optical waveguide A are properly determined according to the size of the display 31 of the touch panel 3C. For example, the elongated optical waveguide A has a length of about 120 to about 1200 mm, a width of about 5 to about 50 min. The number of the light emitting cores (light receiving cores) 3 is determined according to the number of operation items to be displayed on the display screen of the display 31 and, for example, is about 20 to about 150.

Next, an exemplary production method for the inventive optical waveguide A will be described.

A planar base 1 (see FIG. 3(*a*)) to be used for the production of the optical waveguide A is first prepared. Exemplary materials for the base 1 include glass, quartz, silicon, resins and metals. The base 1 has a thickness of, for example, 20 μm (for a film base 1) to 5 mm (for a plate base 1).

In turn, as shown in FIG. 3(*a*), a photosensitive resin layer for formation of the under-cladding layer 2 is formed on a predetermined region of the base 1, and exposed to radiation. Then, the photosensitive resin layer is heat-treated for completion of a photoreaction. The resulting photosensitive resin layer serves as the under-cladding layer 2. The under-cladding layer 2 (photosensitive resin layer) typically has a thickness of 10 to 1000 μm.

For the formation of the photosensitive resin layer for the formation of the under-cladding layer 2, a varnish prepared by dissolving a photosensitive resin in a solvent is applied onto the base 1, and then dried by a heat treatment. The application of the varnish is achieved, for example, by a spin coating method, a dipping method, a casting method, an injection method, an ink jet method or the like. The subsequent heat treatment is performed at 50° C. to 120° C. for 10 to 30 minutes. Examples of the radiation for the exposure include visible light, ultraviolet radiation, infrared radiation, X-rays, α-rays, β-rays and γ-rays. Preferably, the ultraviolet radiation is used. The use of the ultraviolet radiation permits irradiation at a higher energy to provide a higher curing speed. In addition, a less expensive smaller-size irradiation apparatus can be employed, thereby reducing production costs. Examples of a light source for the ultraviolet radiation include a low-pressure mercury-vapor lamp, a high-pressure mercury-vapor lamp and an ultra-high-pressure mercury-vapor lamp. The dose of the ultraviolet radiation is typically 10 to 10000 mJ/cm$^2$, preferably 50 to 3000 mJ/cm$^2$. The subsequent heat treatment is performed at 80° C. to 250° C., preferably at 100° C. to 200° C., for 10 seconds to two hours, preferably for five minutes to one hour.

Next, as shown in FIG. 3(*b*), a photosensitive resin layer for formation of the cores 3 is formed on a surface of the under-cladding layer 2, and exposed to radiation via an exposure mask formed with an opening pattern corresponding to a core pattern. Then, the resulting photosensitive resin layer is heat-treated for completion of a photoreaction. A development process is performed by dissolving away an unexposed portion of the photosensitive resin layer with the use of a developing agent. Thus, portions of the photosensitive resin layer remaining on the under-cladding layer 2 are defined in the care pattern. Then, the developing solution in the remaining portions of the photosensitive resin layer is removed by a heat treatment. The remaining portions of the photosensitive resin layer serve as the cores 3 (with a predetermined longitudinally middle portion of the under-cladding layer 2 being uncovered with the cores 3). The cores 3 (photosensitive resin layer) typically each have a thickness of 10 to 100 μm, and a width of 8 to 50 μm.

The formation of the photosensitive resin layer for the formation of the cores 3 is achieved in the same manner as the formation of the photosensitive resin layer for the formation of the under-cladding layer 2 described with reference to FIG. 3(*a*). A material for the cores 3 has a greater refractive index than the materials for the aforementioned under-cladding layer 2 and over-cladding layers 4 to be described later (see FIG. 3(*d*)). The refractive index may be adjusted, for example, by selection of the types of the materials for the under-cladding layer 2, the cores 3 and the over-cladding layers 4 and adjustment of the composition ratio thereof. The exposure and the subsequent heat treatment are achieved in the same manner as for the formation of the under-cladding layer 2 described with reference to FIG. 3(*a*). Exemplary methods for the development process include an immersion method, a spray method and a puddle method. Examples of the developing solution to be used include an organic solvent and an organic solvent containing an alkaline aqueous solution. The developing solution and conditions for the development are properly selected depending on the composition of the photosensitive resin. The heat treatment subsequent to the development is typically performed at 80° C. to 120° C. for 10 to 30 minutes.

Subsequently, a molding die 40 which has a molding recess (later serving as a molding cavity S) having a molding surface conformable to the surface geometry of the over-cladding layers 4 (see FIG. 3(*d*)) as shown in FIG. 3(*c*) and is made of quartz (a material pervious to radiation such as ultraviolet radiation) is prepared. As shown, an opening of the molding recess of the molding die 40 is positioned at a predetermined position on the surface of the base 1. At this time, the molding cavity S is defined by the molding surface of the molding recess and the surfaces of the under-cladding layer 2 and the cores 3. A photosensitive resin for formation of the over-cladding layers 4 is injected into the molding cavity S from an injection port 41 of the molding die 40, and then exposed to radiation such as ultraviolet radiation through the molding die 40. The exposure is achieved in the same manner as for the formation of the under-cladding layer 2 described with reference to FIG. 3(*a*).

In turn, as shown in FIG. 3(*d*), the resulting product is demolded and then heat-treated. Thus, the over-cladding layers 4 are formed over the cores 3 with the predetermined longitudinally middle portion of the under-cladding layer 2 (corresponding to the recess 7) being uncovered therewith. The heat treatment and the like are achieved in the same manner as for the formation of the under-cladding layer 2 described with reference to FIG. 3(*a*), The over-cladding layers 4 typically each have a thickness of 300 to 1000 µm (as measured from the surfaces of the cores 3). Upon the formation of the over-cladding layers 4, neither the cores 3 nor the over-cladding layers 4 cover the longitudinally middle portion of the under-cladding layer 2, but the recess 7 is formed on the longitudinally middle portion with its bottom defined by the uncovered surface portion of the under-cladding layer 2 and with its wall surfaces defined by opposed end faces of the cores 3 and the over-cladding layers 4.

Subsequently, as shown in FIG. 3(*e*), the base 1 is separated from the under-cladding layer 2. For the separation, for example, the base 1 is fixed to a vacuum suction stage (not shown) by air suction with its lower surface in contact with the vacuum suction stage. Then, upper surfaces of the over-cladding layers 4 are held by suction by means of a vacuum suction device (not shown) and, in this state, a suction portion of the device is lifted. Thus, the under-cladding layer 2 of the optical waveguide A is separated together with the cores 3 and the over-cladding layers 4 bonded thereto from the base 1. Here, adhesion between the base 1 and the under-cladding layer 2 is set at a lower level than adhesion between the over-cladding layers 4 and the cores 3, adhesion between the over-cladding layers 4 and the under-cladding layer 2 and adhesion between the cores 3 and the under-cladding layer 2 by properly selecting the materials. This facilitates the separation.

Thereafter, a portion of the resulting product later serving as the elongated optical waveguide A is cut out (as having a projection 5 in one of longitudinally opposite end portions thereof and a recess 6 in the other end portion thereof) by stamping with a cutting die. At this time, the positions of the projection 5 and the recess 6 are determined such that, when the projection 5 is engaged with the recess 6, the distal ends of the light emitting cores 3 are opposed to the distal ends of the light receiving cores 3 with the intervention of the display 31 (see FIG. 2(*a*)), Thus, the elongated optical waveguide A (see FIGS. 1(*a*) and 1(*b*)) is obtained.

Figure 4:
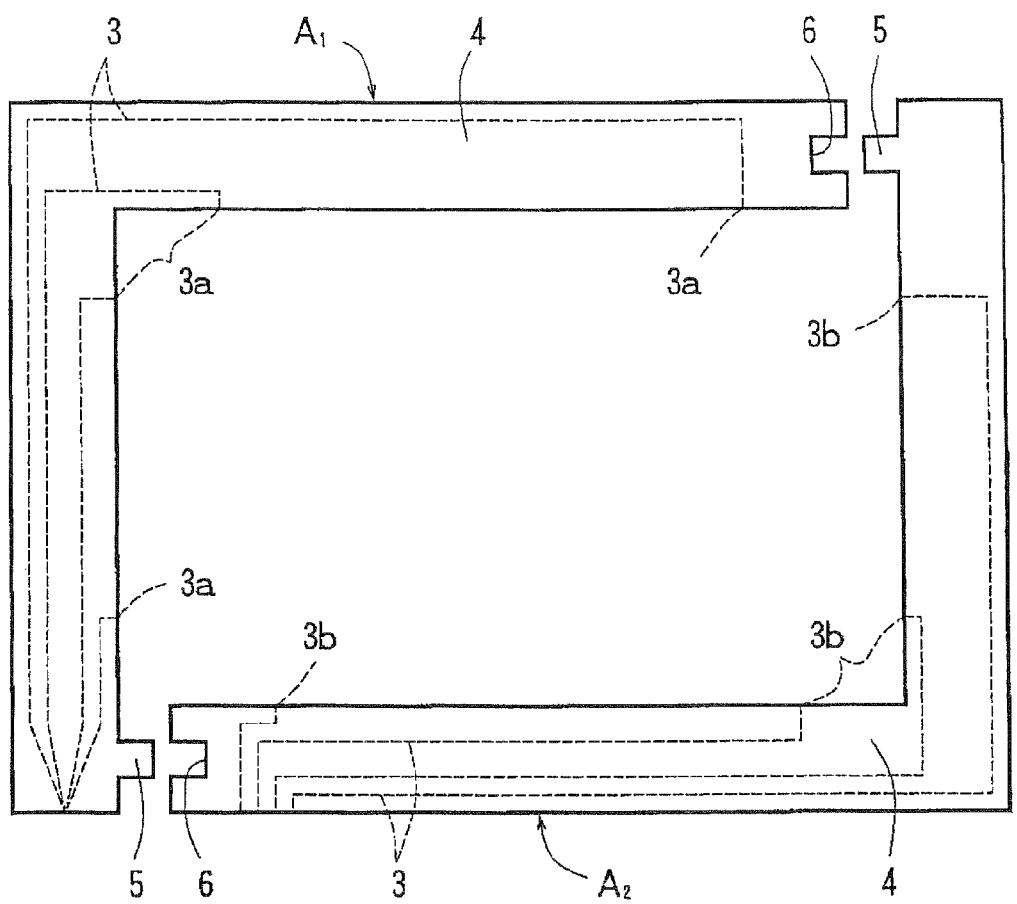
FIG. 4 is a plan view schematically illustrating an optical waveguide according to a second embodiment of the present invention.

FIG. 4 illustrates an optical waveguide according to a second embodiment of the present invention. The optical waveguide of this embodiment includes a set of two generally L-shaped planar optical waveguides $A_1$, $A_2$ disposed in a frame configuration around the periphery of a display screen of a display 31 shown in FIG. 5. FIG. 4 shows the generally L-shaped planar optical waveguides before they are placed in the frame configuration. The generally L-shaped planar optical waveguides $A_1$, $A_2$ are each produced in substantially the same manner as in the first embodiment, so that a plurality of cores 3 are held between and enclosed by an under-cladding layer 2 and an over-cladding layer 4. Of the generally L-shaped planar optical waveguides $A_1$, $A_2$, one generally L-shaped planar optical waveguide $A_1$ is a light emitting member, and includes light emitting cores 3 each having a distal end 3*a* positioned and exposed on an inward edge thereof. The other generally L-shaped planar optical waveguide $A_2$ is a light receiving member, and includes light receiving cores 3 each having a distal end 3*b* positioned and exposed on an inward edge thereof. In the present invention, the one generally L-shaped planar optical waveguide $A_1$ has a projection 5 provided on an inner side of one of longitudinally opposite end portions thereof and a recess 6 provided in the other end portion thereof, and the other generally L-shaped planar optical waveguide $A_2$ has a recess 6 provided in one of longitudinally opposite end portions thereof and a projection 5 provided on an inner side of the other end portion thereof. In FIG. 4, the cores 3 are indicated by broken lines, and the thicknesses of the broken lines indicate the widths of the cores 3. In FIG. 4, the cores 3 are illustrated with some of them omitted.

Figure 5:
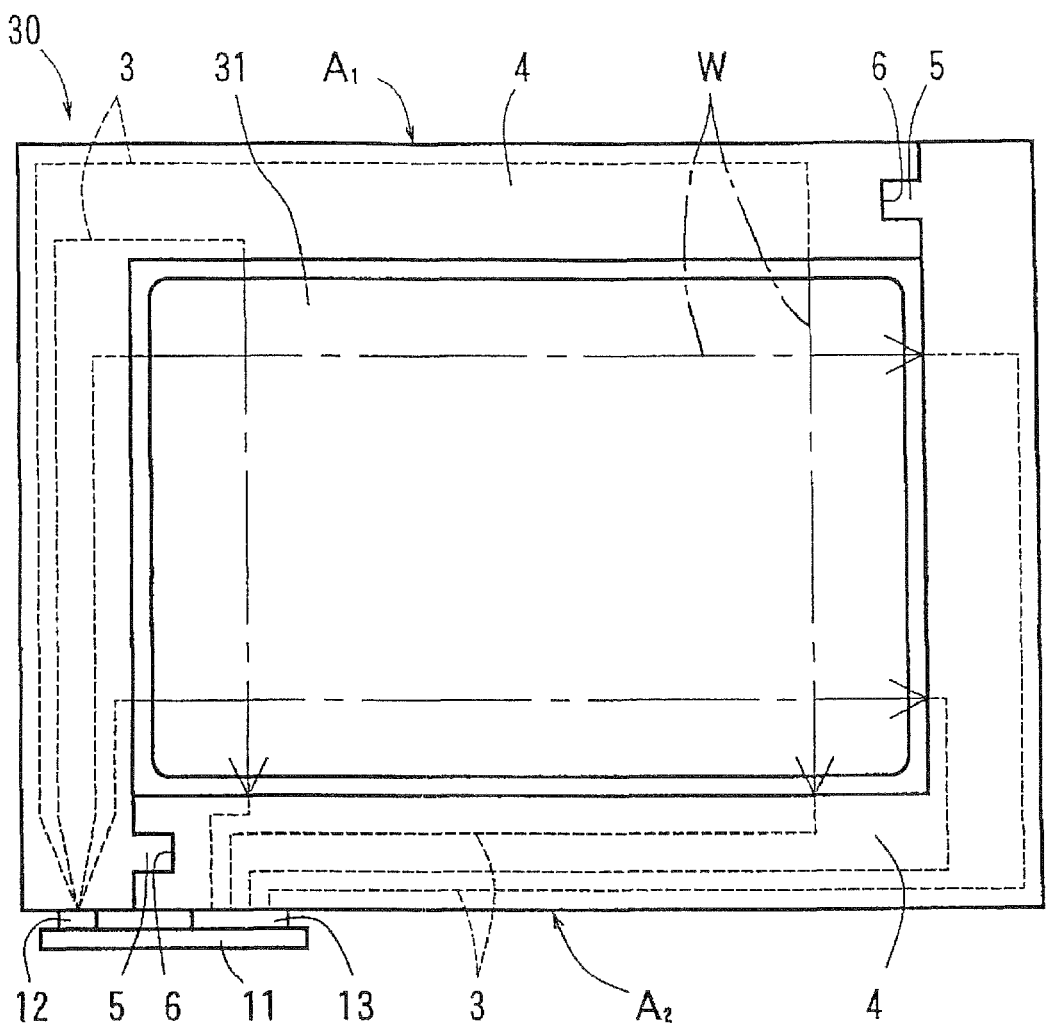
FIG. 5 is a plan view schematically illustrating a touch panel employing the optical waveguide.
Figure 6:
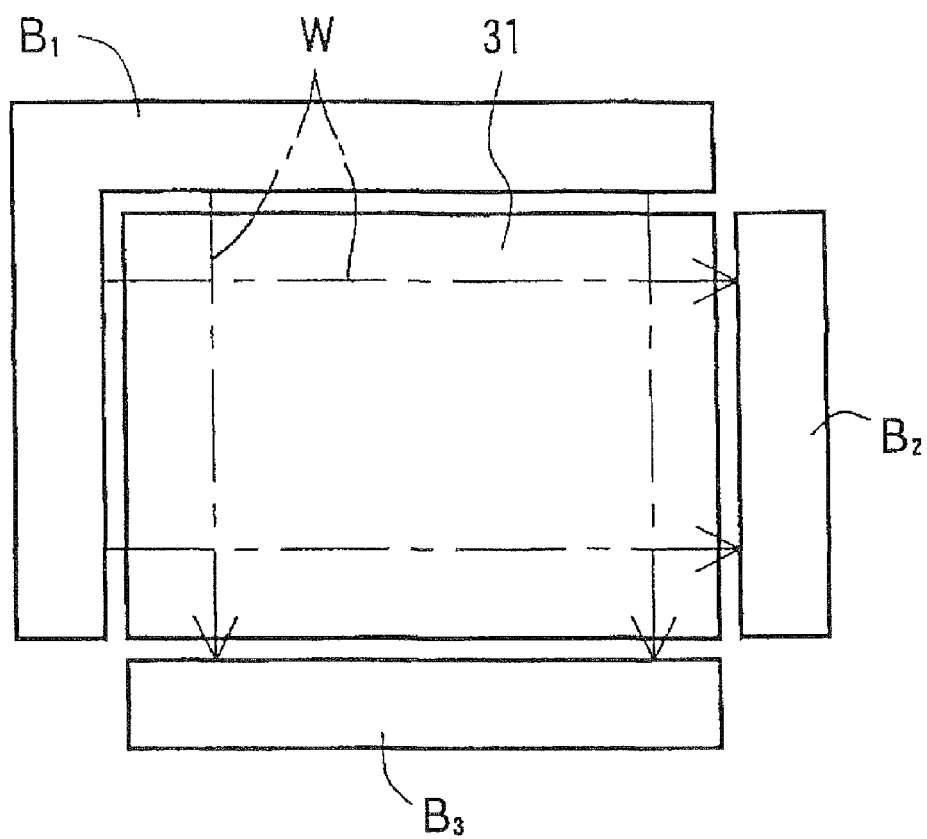
FIG. 6 is a plan view schematically illustrating a touch panel employing a prior-art optical waveguide.

The projections 5 are engaged with the recesses 6 as shown in FIG. 5 when the two generally L-shaped planar optical waveguides $A_1$, $A_2$ are placed in the frame configuration around the periphery of the display screen of the display 31. The generally L-shaped planar optical waveguides $A_1$, $A_2$ are arranged in the frame configuration by the engagement. At this time, the under-cladding layers 2 are disposed adjacent to the display screen of the display 31. With the projections 5 in engagement with the recesses 6, the opposite ends of the one generally L-shaped planar optical waveguide $A_1$ are horizontally and vertically positioned with respect to the opposite ends of the other generally L-shaped planar optical waveguide $A_2$, whereby the distal ends of the light emitting cores 3 are automatically and accurately opposed to the distal ends of the light receiving cores 3 with the intervention of the display screen of the display 31. In this embodiment, the generally L-shaped planar optical waveguides $A_1$, $A_2$ are designed such that the distal ends of the light emitting cores 3 are accurately opposed to the distal ends of the light receiving cores 3 when the projections 5 are engaged with the recesses 6. In FIG. 5, only some of multiple light beams W are shown for ease of understanding.

In this embodiment, no core 3 is present on and around the projections 5 and the recesses 6, but surface portions of the under-cladding layers 2 on and around the projections 5 and the recesses 6 are covered with the over-cladding layers 4. The projections 5 each have, for example, a projection length of 0.5 to 5 mm, and a projection width of 0.5 to 5 mm. The recesses 6 are dimensioned such as to be respectively engaged with the projections 5 (so as to have a depth of 0.5 to 5 mm and a recess width of 0.5 to 5 mm).

In this embodiment, proximal ends of the light emitting cores 3 of the one generally L-shaped planar optical waveguide $A_1$ are concentrated on a single point and exposed at the one end of the one generally L-shaped planar optical waveguide $A_1$ (on a lower left side in FIG. 5), and the light emitting means 12 abuts against the proximal ends of the light emitting cores 3. Further, proximal ends of the light receiving cores 3 of the other generally L-shaped planar optical waveguide $A_2$ are positioned and exposed on an outer side of the one end portion of the other generally L-shaped planar optical waveguide $A_2$ (on a lower left side in FIG. 5), and the light receiving means 13 abuts against the proximal ends of the light receiving cores 3. The light emitting means 12 and the light receiving means 13 are fixed to opposite end portions of a surface of a single substrate 11, and respectively mounted on the two generally L-shaped planar optical waveguides $A_1$, $A_2$ after the generally L-shaped planar optical waveguides $A_1$, $A_2$ are fitted around the periphery of the display 31.

The dimensions of the two generally L-shaped planar optical waveguides $A_1$, $A_2$ are determined according to the size of the display 31 of the touch panel 30. For example, the generally L-shaped planar optical waveguides $A_1$, $A_2$ each have an edge length of about 30 to about 300 mm and an edge width of about 5 to about 10 mm. The number of the light emitting cores (light receiving cores) 3 is determined according to the number of operation items to be displayed on the display screen of the display 31 and, for example, is about 20 to about 150.

In the embodiments described above, the formation of the projection 5 and the recess 6 in the opposite end portions of each of the optical waveguides A, $A_1$, $A_2$ is achieved by the stamping or a like cutting method, but may be achieved in other ways. For example, the formation of the projection 5 and the recess 6 may be achieved by forming a projection and a recess in opposite end portions of the under-cladding layer 2 by exposure through an exposure mask and development in the formation of the under-cladding layer 2, and forming a projection and a recess in opposite end portions of the over-cladding layer 4 in superposed relation to the projection and the recess of the under-cladding layer 2 by exposure through an exposure mask and development in the formation of the over-cladding layer 4. In the embodiments described above, the single projection 5 or recess 6 is provided in each end portion of the optical waveguides, but two or more projections 5 or recesses 6 may be formed in each end portion of the optical waveguides.

In the embodiments described above, the distal ends 3a, 3b of the cores 3 are exposed, but may be covered with the over-cladding layers 4. In this case, the distal ends 3a, 3b of the cores 3 and edge portions of the over-cladding layers 4 (which respectively cover the distal ends 3a and 3b) may each have a lens shape so as to suppress divergence of emitted light and to converge incident light.

In the embodiments described above, the formation of the under-cladding layer 2 and the over-cladding layer 4 is achieved through the exposure by using the photosensitive resin as the material, but may be achieved in other ways. For example, a thermosetting resin such as a polyimide resin or an epoxy resin may be used as the materials for the under-cladding layer 2 and the over-cladding layer 4. In this case, the formation of the under-cladding layer 2 and the over-cladding layer 4 may be achieved by applying a varnish prepared by dissolving the thermosetting resin in a solvent, and curing the varnish by a heat treatment (typically at 300° C. to 400° C. for 60 to 180 minutes).

In the embodiments described above, the under-cladding layer 2 is formed by using the photosensitive resin, but otherwise a resin film may be used as the under-cladding layer 2. Further, a substrate formed with a metal film or a metal thin film may be used instead of the under-cladding layer 2. In this case, the surface of the metal material serves as a reflection surface on which light transmitted through the cores 3 is reflected.

In the embodiments described above, the base 1 is separated from the under-cladding layer 2 before the optical waveguide A, $A_1$, $A_2$ is cut out in the production of the optical waveguide A, $A_1$, $A_2$, Where a film is used as the base 1, the film base 1 may be separated from the under-cladding layer 2 after the elongated optical waveguide is cut out together with the film base 1, or the optical waveguide A, $A_1$, $A_2$ may be used together with the base 1 without the separation of the base 1.

Next, inventive examples will be described. However, it should be understood that the invention is not limited to the examples.

EXAMPLES

Examples 1 and 2

Material for Under-Cladding Layer and Over-Cladding Layer

A material for an under-cladding layer and an over-cladding layer was prepared by mixing 35 parts by weight of bisphenoxyethanolfluorene glycidyl ether (Component A) represented by the following general formula (I), 40 parts by weight of 3',4'-epoxycyclohexylmethyl-3,4-epoxycyclohexane carboxylate which is an alicyclic epoxy resin (CELLOXIDE 2021P manufactured by Daicel Chemical Industries, Ltd.) (Component B), 25 parts by weight of (3',4'-epoxycyclohexane)methyl-3',4'-epoxycyclohexyl-carboxylate (CELLOXIDE 2081 manufactured by Daicel Chemical Industries, Ltd.) (Component C), and 2 parts by weight of a 50% propione carbonate solution of 4,4'-bis[di(β-hydroxyethoxy)phenylsulfinio]phenylsulfide bishexafluoroantimonate (Component D).

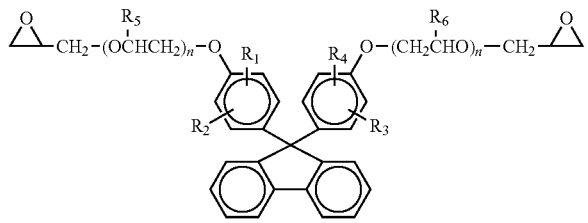

wherein $R_1$ to $R_6$ are hydrogen atoms, and n=1.

Material for Cores

A material for cores was prepared by dissolving 70 parts by weight of Component A, 30 parts by weight of 1,3,3-tris{4-[2-(3-oxetanyl)]butoxyphenyl}butane and 1 part by weight of Component D in 28 parts by weight of ethyl lactate.

Production of Elongated Optical Waveguide (Example 1) and Two Generally L-shaped Planar Optical Waveguides (Example 2)

An elongated optical waveguide (Example 1) and two generally L-shaped planar optical waveguides (Example 2) were each produced in the following manner. The under-cladding layer material was applied onto a surface of a polyethylene naphthalate (PEN) film (300 mm×300 mm×188 μm (thickness)) by a spin-coating method, and then exposed to ultraviolet radiation at 2000 mJ/cm² via a synthetic quartz-based chromium mask (exposure mask) formed with a 250 mm×8 nm rectangular opening, Subsequently, a heat treatment was performed at 100° C. for 15 minutes. Thus, an under-cladding layer was formed. The under-cladding layer had a thickness of 500 μm as measured by a contact film thickness meter. Further, the under-cladding layer had a refractive index of 1.502 at a wavelength of 830 nm.

Then, the core material was applied onto a surface of the under-cladding layer by a spin-coating method, and dried at 100° C. for 15 minutes. In turn, a synthetic quartz-based chromium mask (exposure mask) formed with an opening pattern conformable to a core pattern was placed above the resulting core material film. After the core material film was exposed to ultraviolet radiation emitted from above at 4000 mJ/cm$^2$ by a contact exposure method, a heat treatment was performed at 120° C. for 15 minutes. Subsequently, a development process was performed by using a γ-butyrolactone aqueous solution to dissolve away unexposed portions, and then a heat treatment was performed at 120° C. for 30 minutes. Thus, cores were formed. Intermediate portions of the cores each had a sectional area of 15 μm (width)×24 μm (height) as measured by an SEM (scanning electron microscope). The cores each had a refractive index of 1.588 at a wavelength of 830 nm.

Subsequently, a quartz molding die for formation of an over-cladding layer was prepared. The molding die had a recess having a molding surface conformable to the surface geometry of the over-cladding layer and having a depth of 1 mm. Then, the molding die was brought into intimate contact with the surface of the base with an opening of the recess thereof being properly positioned. In this state, the over-cladding layer material was injected into a molding cavity from an injection port provided in the molding die, and then exposed to ultraviolet radiation at 2000 mJ/cm$^2$ through the molding die. The resulting product is demolded, and then heat-treated at 150° C. for 60 minutes. Thus, the over-cladding layer was formed. The over-cladding layer had a thickness of 476 μm as measured from the surfaces of the cores by observing a section of the over-cladding layer by a microscope. Further, the over-cladding layer had a refractive index of 1.502 at a wavelength of 830 nm.

Then, the elongated optical waveguide (Example 1) and the two generally L-shaped planar optical waveguides (Example 2) were each cut out by stamping with the use of a cutting die. Thus, the elongated optical waveguide (having a length of 250 mm and a width of 10 mm) was produced as having a projection (having a projection length of 5 mm and a projection width of 5 mm) provided in one end portion thereof and a recess (having a depth of 5 mm and a recess width of 5 mm) provided in the other end portion thereof. Of the two generally L-shaped planar optical waveguides, one generally L-shaped planar optical waveguide was produced as having a projection (having a projection length of 3 mm and a projection width of 3 mm) provided on an inner side of one end portion thereof and a recess (having a depth of 3 mm and a recess width of 3 mm) provided on an inner side of the other end portion thereof. The other generally L-shaped planar optical waveguide was produced as having a recess (having a depth of 3 mm and a recess width of 3 mm) provided in one end portion thereof and a projection (having a projection length of 3 mm and a projection width of 3 mm) provided in the other end portion thereof. The projections and the recesses were configured such that distal ends of the light emitting cores were opposed to distal ends of the light receiving cores with the intervention of a display when the projections were engaged with the recesses. A frame constituted by the two generally L-shaped planar optical waveguides had an outer size of 77 mm×66.3 mm and a frame width of 6 mm.

Touch Panel 1 (with Optical Waveguide of Example 1)

The elongated optical waveguide was wrapped around a periphery of a rectangular display of a touch panel. At this time, the projection and the recess provided in the opposite end portions of the elongated optical waveguide were positioned at one corner of the display and engaged with each other in perpendicularly crossing relation. As a result, the distal ends of the light emitting cores were accurately opposed to the distal ends of the light receiving cores with the intervention of the display screen of the display.

Touch Panel 2 (with Optical Waveguide of Example 2)

The two generally L-shaped planar optical waveguides were placed around a periphery of a display screen of a rectangular display of a touch panel. At this time, the projection and the recess provided in opposite end portions of one of the two generally L-shaped planar optical waveguides were respectively engaged with the recess and the projection provided in opposite end portions of the other generally L-shaped planar optical waveguide, whereby a frame was formed. As a result, the distal ends of the light emitting cores were accurately opposed to the distal ends of the light receiving cores with the intervention of the display screen of the display.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. An elongated touch panel optical waveguide to be wrapped around a periphery of a display of a touch panel, the optical waveguide comprising:
    a plurality of light emitting cores provided in a longitudinal generally-half portion of the elongated touch panel optical waveguide;
    a plurality of light receiving cores provided in the other longitudinal generally-half portion of the optical waveguide;
    the light emitting cores and the light receiving cores each having a distal end which is located on one longitudinal side edge of the elongated touch panel optical waveguide;
    a projection provided in one of longitudinally opposite end portions of the elongated touch panel optical waveguide; and
    a recess provided in the other end portion to be engaged with the projection;
    wherein the distal ends of the light emitting cores are positioned in opposed relation to the distal ends of the light receiving cores with the intervention of the display screen of the touch panel with the projection in engagement with the recess.

2. A touch panel comprising:
    a display; and
    a touch panel optical waveguide as recited in claim 1;
    the touch panel optical waveguide being wrapped around a periphery of the display,
    wherein the projection provided in the one of the longitudinally opposite end portions of the touch panel optical waveguide is engaged with the recess provided in the other end portion, and the distal ends of the light emitting cores are positioned in opposed relation to the distal ends of the light receiving cores with the intervention of a display screen of the display.

3. A touch panel optical waveguide comprising:
a set of a first and a second generally L-shaped planar optical waveguides to be disposed in a frame configuration around a periphery of a display screen of a display of a touch panel;
the first generally L-shaped planar optical waveguides including a plurality of light emitting cores each having a distal end positioned on an inward edge thereof;
the second generally L-shaped planar optical waveguide including a plurality of light receiving cores each having a distal end positioned on an inward edge thereof;
the first generally L-shaped planar optical waveguide having a recess or a projection provided in longitudinally opposite end portions thereof;
the second generally L-shaped planar optical waveguide having a projection or a recess provided in longitudinally opposite end portions thereof to be respectively engaged with the recess or the projection of the first generally L-shaped planar optical waveguide;
wherein the distal ends of the light emitting cores of the first generally L-shaped planar optical waveguide are positioned in opposed relation to the distal ends of the light receiving cores of the second generally L-shaped planar optical waveguide with the intervention of the display screen of the touch panel with the projections in engagement with the recesses.

4. A touch panel comprising:
a display; and
a touch panel optical waveguide as recited in claim 3;
the first and the second generally L-shaped planar optical waveguides of the touch panel optical waveguide being disposed in a frame configuration around a periphery of a display screen of the display,
wherein the projection and the recess provided in the longitudinally opposite end portions of one of the first and the second generally L-shaped planar optical waveguides are respectively engaged with the recess and the projection provided in the longitudinally opposite end portions of the other of the first and the second generally L-shaped planar optical waveguide, and the distal ends of the light emitting cores are positioned in opposed relation to the distal ends of the light receiving cores with the intervention of the display screen of the display.

* * * * *